US011519453B2

(12) United States Patent
Zhou

(10) Patent No.: US 11,519,453 B2
(45) Date of Patent: Dec. 6, 2022

(54) LOCK NUT, LOCK SCREW, AND THREADED FASTENING ASSEMBLY

(71) Applicant: ZHONGSHAN MEITU PLASTIC IND. CO., LTD., Zhongshan (CN)

(72) Inventor: Wenhui Zhou, Zhongshan (CN)

(73) Assignee: ZHONGSHAN MEITU PLASTIC IND. CO., LTD., Zhongshan (CN)

(*) Notice: Subject to any disclaimer, the term of this patent is extended or adjusted under 35 U.S.C. 154(b) by 381 days.

(21) Appl. No.: 16/815,005

(22) Filed: Mar. 11, 2020

(65) Prior Publication Data
US 2021/0285484 A1 Sep. 16, 2021

(51) Int. Cl.
F16B 39/30 (2006.01)
(52) U.S. Cl.
CPC .................................. F16B 39/30 (2013.01)
(58) Field of Classification Search
CPC ........ F16B 39/30; F16B 39/28; F16B 39/282; F16B 39/22; Y10S 411/929
USPC .......................................... 411/166, 167, 168
See application file for complete search history.

(56) References Cited

U.S. PATENT DOCUMENTS

| 6,183,293 B1* | 2/2001 | Kieninger | H01R 13/746 439/321 |
| 11,199,217 B2* | 12/2021 | Zhou | F16B 37/145 |
| 2021/0396266 A1* | 12/2021 | Santos | F16B 5/0208 |

FOREIGN PATENT DOCUMENTS

EP 2224143 * 9/2010

OTHER PUBLICATIONS

Machine Translation of EP2224143 from Espacenet (Year: 2022).*

* cited by examiner

Primary Examiner — Mark R Wendell
(74) Attorney, Agent, or Firm — Bayramoglu Law Offices LLC

(57) ABSTRACT

A threaded fastening assembly includes a nut body and a screw body. The internal thread of the nut body includes a nut thread crest and a nut thread root. The external thread of the screw body includes a screw thread crest, a screw thread root, a fourth side wall located on one side of the screw thread crest, and a fifth side wall located on the other side of the screw thread crest. A locking notch located on one side of the nut thread crest is arranged on the internal thread. The locking notch includes a first side wall and a bottom wall. One end of the first side wall is connected to the nut thread crest, and the other end of the first side wall is connected to one end of the bottom wall. The bottom wall is spirally distributed around the axis of the nut body.

9 Claims, 6 Drawing Sheets

LOCK NUT, LOCK SCREW, AND THREADED FASTENING ASSEMBLY

TECHNICAL FIELD

The present disclosure relates to threaded fasteners, and more particularly to a lock nut.

BACKGROUND

Present screw threads used for nuts are typically measured under metric (cm, mm) or English (inch) units. Nuts mated with these threaded screws, however, are easily loosened over time and result in insufficient locking force.

SUMMARY

In order to solve the above shortcomings, the present disclosure provides a lock nut, a lock screw, and a threaded fastening assembly that have an improved locking force and are less likely to loosen.

The present disclosure provides the following technical solutions to achieve the above-mentioned objective.

A lock nut includes a nut body. The nut body includes a screw hole and an internal thread formed in the inner side wall of the screw hole. The internal thread includes a nut thread crest and a nut thread root. The internal thread is provided with a locking notch located on one side of the nut thread crest. The locking notch includes a first side wall and a bottom wall. One end of the first side wall is connected to the nut thread crest, and the other end of the first side wall is connected to one end of the bottom wall. The bottom wall is spirally distributed along the axial direction of the nut body, and the bottom wall is located between the nut thread crest and the nut thread root. When the nut body is screwed to be tightened to the screw body, the external thread of the screw body enters the locking notch, and the screw thread crest of the screw body is in interference fit with the bottom wall.

In one embodiment, the internal thread is further provided with a second side wall located on one side of the nut thread root. One end of the second side wall is connected to the nut thread root, and the other end of the second side wall is connected to the bottom wall by a chamfer or a rounded corner.

In a more preferred embodiment, the internal thread is further provided with a third side wall located on the other side of the nut thread root.

A threaded fastening assembly includes a nut body and a screw body screwed to the nut body. The nut body includes a screw hole and an internal thread arranged on an inner side wall of the screw hole. The internal thread includes a nut thread crest and a nut thread root. The screw body includes an external thread. The external thread includes a screw thread crest and a screw thread root. The external thread further includes a fourth side wall located on one side of the screw thread crest and a fifth side wall located on the other side of the screw thread crest. The internal thread is provided with a locking notch located on one side of the nut thread crest. The locking notch includes a first side wall and a bottom wall. One end of the first side wall is connected to the nut thread crest, and the other end of the first side wall is connected to one end of the bottom wall. The bottom wall is spirally distributed around the axis of the nut body. The bottom wall is located between the nut thread crest and the nut thread root. When the nut body is screwed to be tightened to the screw body, the external thread enters the locking notch, and the screw thread crest is in interference fit with the bottom wall.

Preferably, the internal thread is further provided with a second side wall located on one side of the nut thread root. One end of the second side wall is connected to the nut thread root, and the other end of the second side wall is connected to the bottom wall by a chamfer or a rounded corner. When the nut body is not screwed to be tightened to the screw body, the edge of the joint between the screw thread crest and the fourth side wall abuts against the chamfer or the rounded corner. When the nut body is tightened to the screw body, the external thread enters the locking notch and completely occupies the locking notch, the screw thread crest is in interference fit with the bottom wall, and the fourth side wall abuts against the first side wall.

In another embodiment, the internal thread is further provided with a third side wall located on the other side of the nut thread root. When the nut body is not screwed to be tightened to the screw body, the fifth side wall is in close contact with the third side wall.

In yet another embodiment, the included angle between the first side wall and the horizontal plane is 15°±5°. The included angle between the fourth side wall and the horizontal plane is equal to the included angle between the first side wall and the horizontal plane.

Preferably, the included angle between the third side wall and the horizontal plane is 28°±5°, and the included angle between the fifth side wall and the horizontal plane is equal to the included angle between the third side wall and the horizontal plane.

A lock screw includes a screw body. The screw body includes an external thread. The external thread includes a screw thread crest and a screw thread root. The external thread is provided with a locking notch located on one side of the screw thread crest. The locking notch includes a first side wall and a bottom wall. One end of the first side wall is connected to the screw thread crest, and the other end of the first side wall is connected to one end of the bottom wall. The bottom wall is spirally distributed along the axial direction of the screw body, and the bottom wall is located between the screw thread crest and the screw thread root. When the nut body is screwed to be tightened to the screw body, the internal thread of the nut body enters the locking notch, and the nut thread crest of the nut body is in interference fit with the bottom wall.

In still another embodiment, the external thread is further provided with a second side wall located on one side of the screw thread root. One end of the second side wall is connected to the screw thread root, and the other end of the second side wall is connected to the bottom wall by a chamfer or a rounded corner.

The external thread is preferably further provided with a third side wall located on the other side of the screw thread root.

A threaded fastening assembly includes a nut body and a screw body screwed to the screw body. The nut body includes a screw hole and an internal thread arranged on an inner side wall of the screw hole. The internal thread includes a nut thread crest and a nut thread root. The screw body includes an external thread, and the external thread includes a screw thread crest and a screw thread root. The internal thread further includes a fourth side wall located on one side of the nut thread crest and a fifth side wall located on the other side of the nut thread crest. The external thread is provided with a locking notch located on one side of the screw thread crest. The locking notch includes a first side wall and a bottom wall. One end of the first side wall is connected to the screw thread crest, and the other end of the first side wall is connected to one end of the bottom wall. The bottom wall is spirally distributed around the axis of the screw body, and the bottom wall is located between the screw thread crest and the screw thread root. When the nut body is screwed to be tightened to the screw body, the internal thread enters the locking notch, and the nut thread crest is in interference fit with the bottom wall.

In another embodiment, the external thread is further provided with a second side wall located on one side of the screw thread root. One end of the second side wall is connected to the screw thread root, and the other end of the second side wall is connected to the bottom wall by a chamfer or a rounded corner. When the nut body is not screwed to be tightened to the screw body, the edge of the joint between the nut thread crest and the fourth side wall abuts against the chamfer or the rounded corner. When the nut body is tightened to the screw body, the internal thread enters the locking notch and completely occupies the locking notch, the nut thread crest is in interference fit with the bottom wall, and the fourth side wall abuts against the first side wall.

The external thread is further provided with a third side wall located on the other side of the screw thread root. When the nut body is not tightened to the screw body, the fifth side wall is in close contact with the third side wall.

In yet another embodiment, the included angle between the first side wall and the horizontal plane is 15°±5°. The included angle between the fourth side wall and the horizontal plane is equal to the included angle between the first side wall and the horizontal plane.

In another aspect of the invention, the included angle between the third side wall and the horizontal plane is 28°±5°, and the included angle between the fifth side wall and the horizontal plane is equal to the included angle between the third side wall and the horizontal plane.

The advantages of the present disclosure are as follows:

1. The irregular threads are employed to achieve the interference fit, which improves the locking force between the nut body and the screw body and achieves the self-locking function of the nut body and the screw body. Thus, the nut coupled with screw is less likely to loosen.

2. The other end of the second side wall is connected to the bottom wall by a chamfer or a rounded corner. When the nut body is not screwed to be tightened to the screw body, the edge of the joint between the screw thread crest and the fourth side wall abuts on the chamfer or the rounded corner. The chamfer or the rounded corner allows the screw thread crest to enter the locking notch more easily. When the nut body is tightened to the screw body, the external thread enters the locking notch and completely occupies the locking notch, the screw thread crest is in interference fit with the bottom wall, and the fourth side wall abuts on the first side wall.

DETAILED DESCRIPTION OF THE EMBODIMENTS

The present disclosure will be further described in detail hereinafter with reference to the drawings and embodiments.

Figure 1:
FIG. 1 is an exploded view of the present disclosure.
Figure 1:
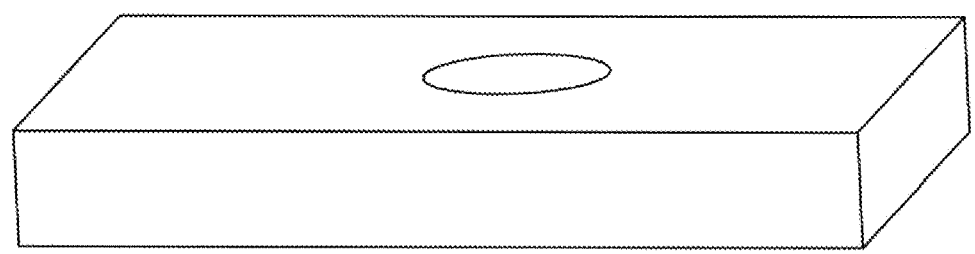
Figure 1:
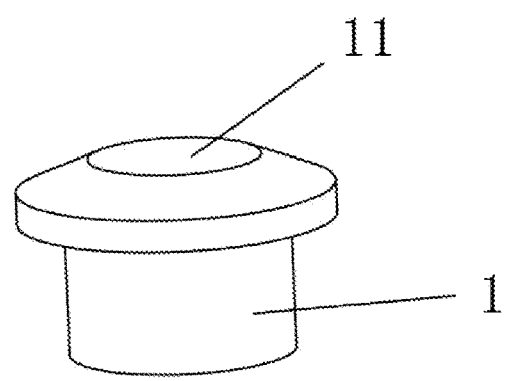
Figure 2:
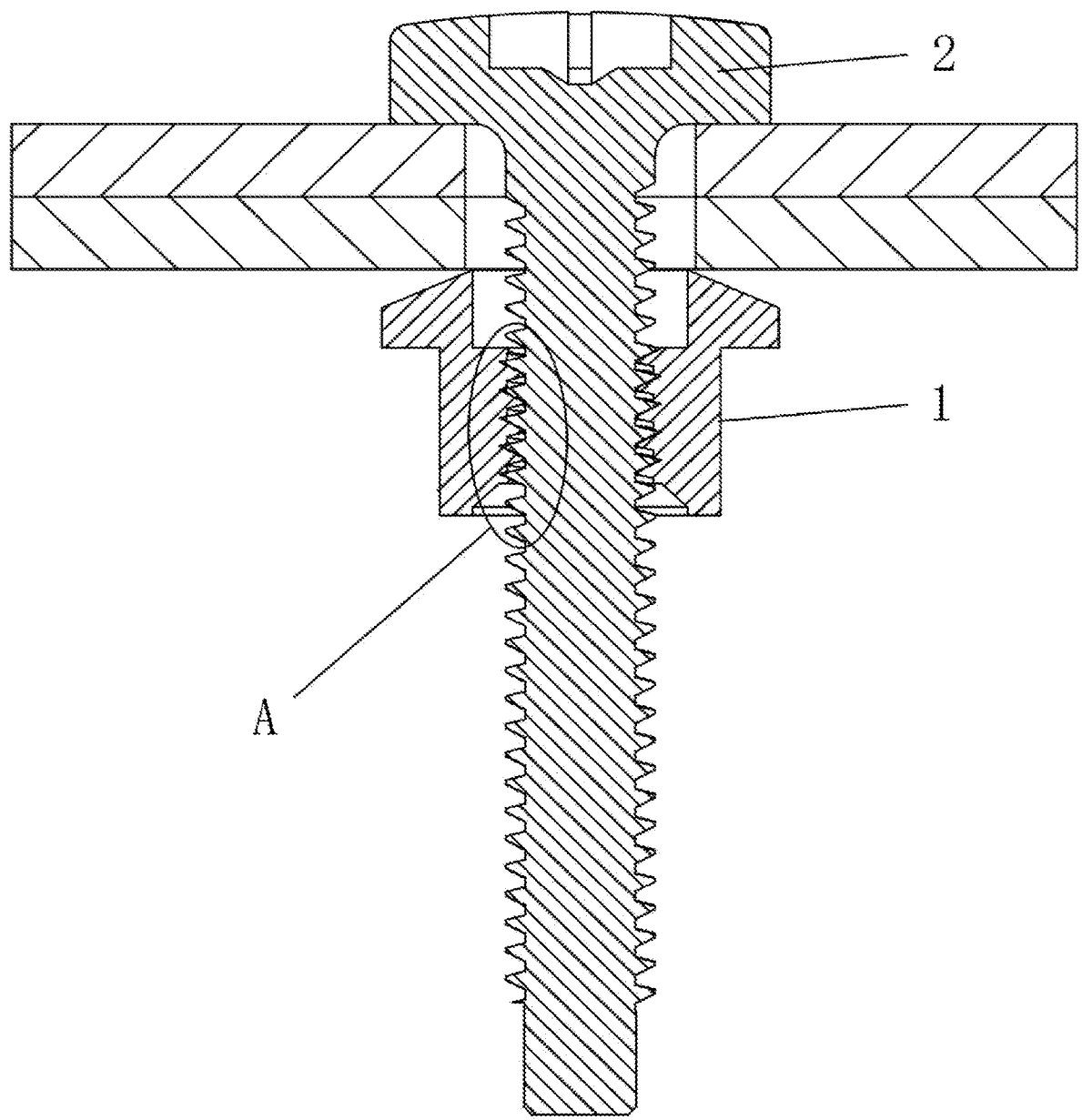
FIG. 2 is a cross-sectional view when the nut body is not screwed to tightened to the screw body.
Figure 3:
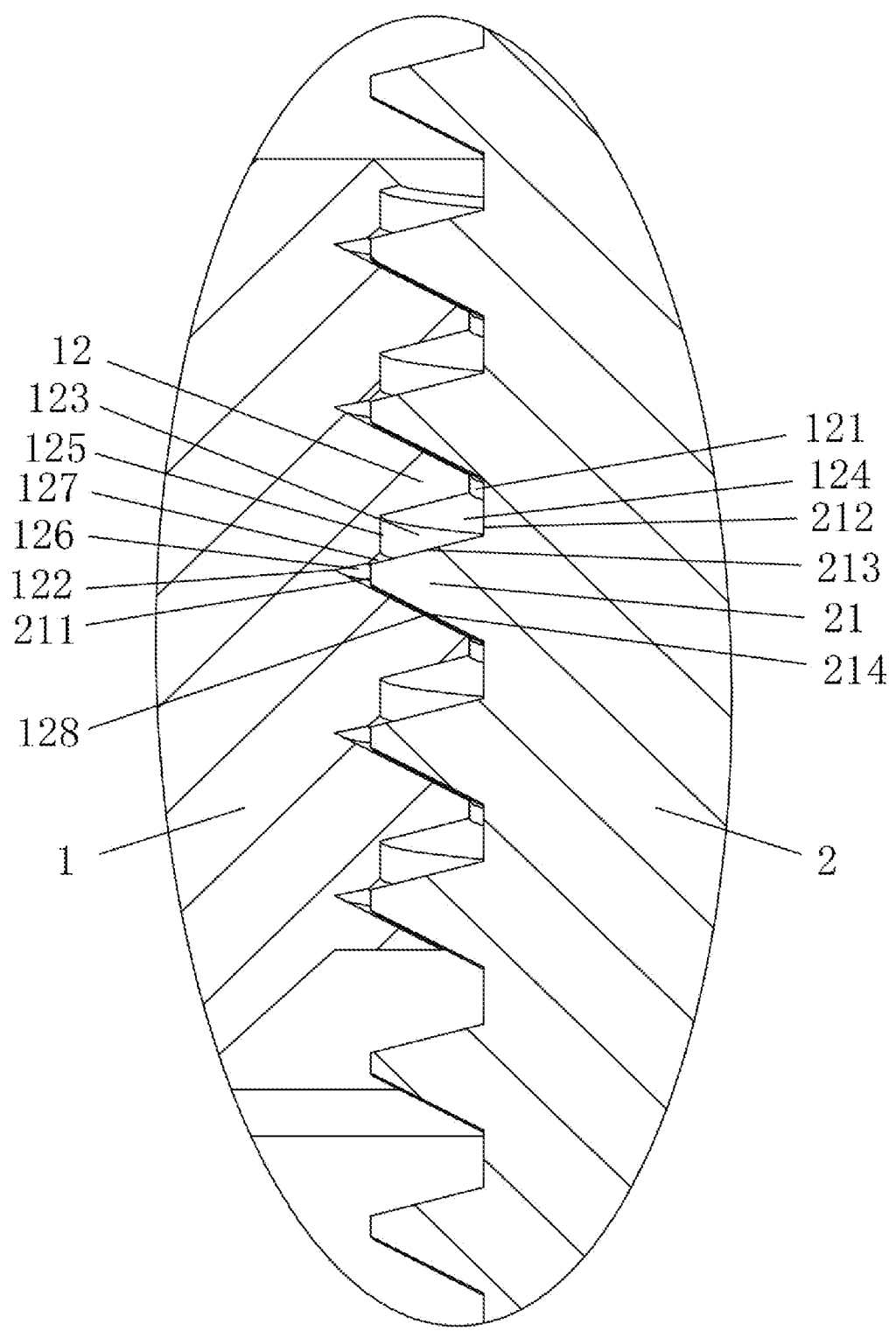
FIG. 3 is an enlarged view showing the portion A in FIG. 2.
Figure 4:
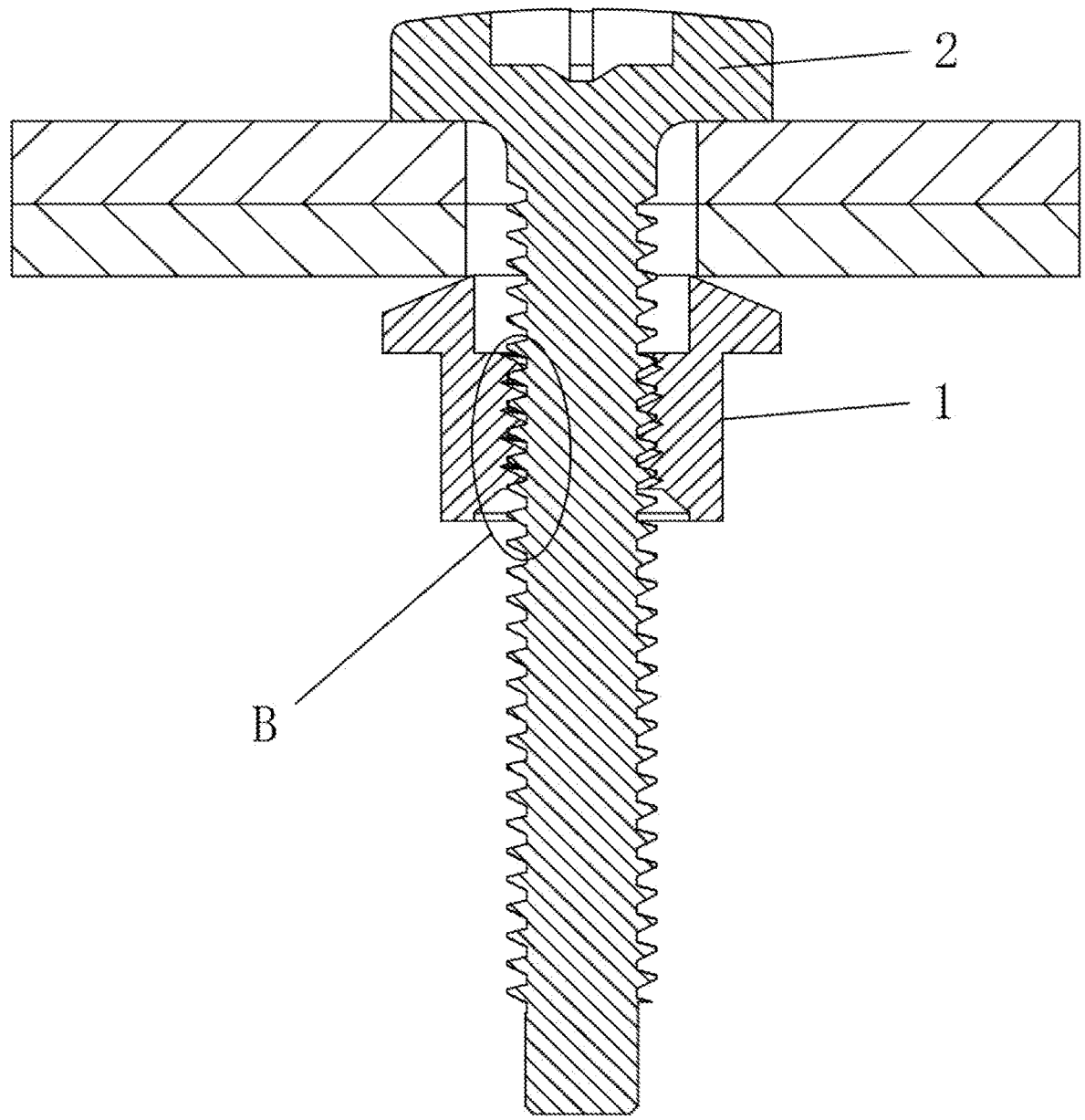
FIG. 4 is a cross-sectional view when the nut body is tightened to the screw body.
Figure 5:
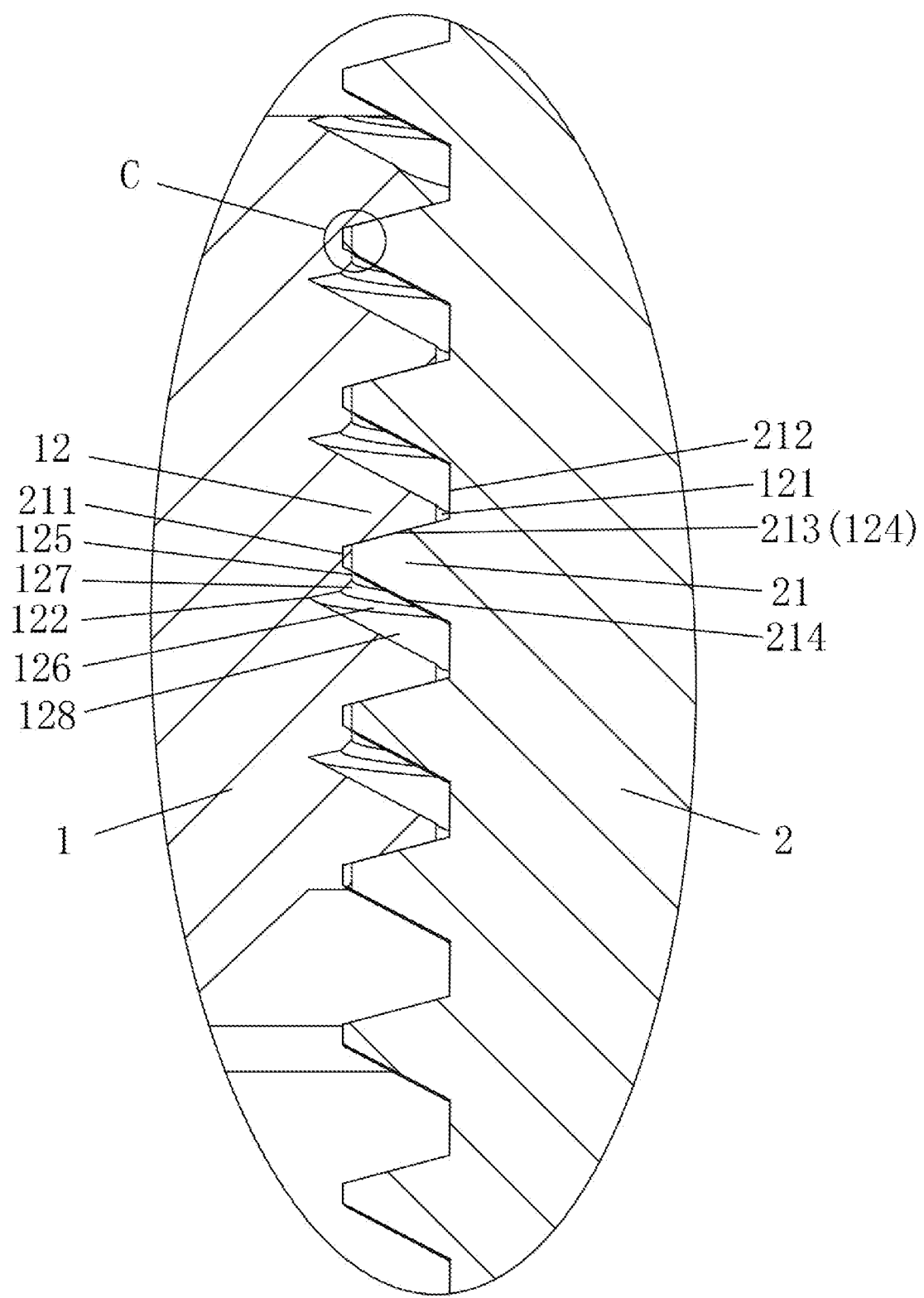
FIG. 5 is an enlarged view showing the portion B in FIG. 4.
Figure 6:
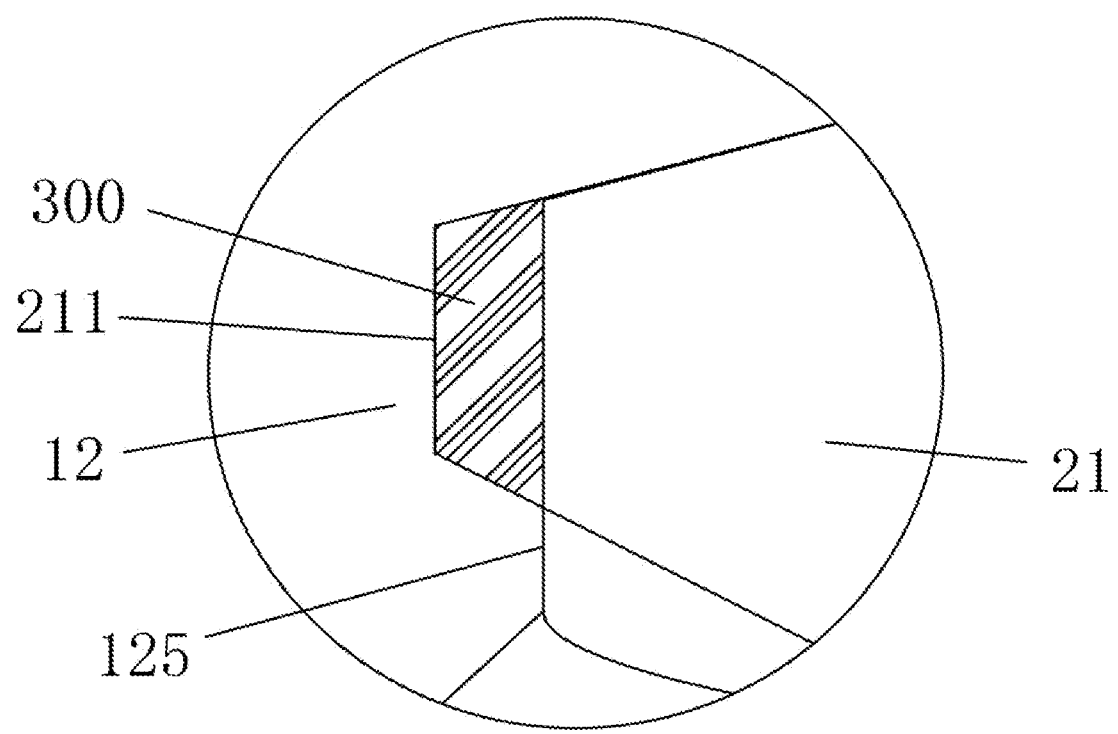
FIG. 6 is an enlarged view showing the portion C in FIG. 5.

As shown in FIGS. 1-6, a lock nut includes the nut body 1. The nut body 1 includes the screw hole 11 and the internal thread 12 arranged on the inner side wall of the screw hole 11. The internal thread 12 includes the nut thread crest 121 and the nut thread root 122. The locking notch 123 located on one side of the nut thread crest 121 is arranged on the internal thread 12. The locking notch 123 includes the first side wall 124 and the bottom wall 125. One end of the first side wall 124 is connected to the nut thread crest 121, and the other end of the first side wall 124 is connected to one end of the bottom wall 125. The bottom wall 125 is spirally distributed along the axial direction of the nut body 1, and the bottom wall 125 is located between the nut thread crest 121 and the nut thread root 122. When the nut body 1 has not been tightened to the screw body 2, the external thread 21 is in clearance fit with the internal thread 12. When the nut body 1 has been tightened to the screw body 2, the external thread 21 of the screw body 2 enters the locking notch 123, and the screw thread crest 211 of the screw body 2 is in interference fit with the bottom wall 125 to strengthen the locking force of the nut body, and achieve the self-locking function, which has the advantage of being less likely to loosen.

In the present embodiment, the internal thread 12 is further provided with the second side wall 126 located on one side of the nut thread root 122. One end of the second side wall 126 is connected to the nut thread root 122, and the other end of the second side wall 126 is connected to the bottom wall 125 by the chamfer 127 or a rounded corner. The chamfer or the rounded corner allows the screw thread crest to enter the locking notch more easily.

The internal thread 12 is further provided with the third side wall 128 located on the other side of the nut thread root 122. When the nut body 1 is not tightened to the screw body 2, the fifth side wall 214 is in close contact with the third side wall 128, which facilitates the engagement between the nut body 1 and the screw body 2.

In one embodiment, the threaded fastening assembly includes the nut body 1 of the lock nut mentioned above, and the screw body 2 screwed to the nut body 1. The nut body 1 includes the screw hole 11 and the internal thread 12 arranged on an inner side wall of the screw hole 11. The internal thread 12 includes the nut thread crest 121 and the nut thread root 122. The screw body 2 includes the external thread 21. The external thread 21 includes the screw thread crest 211 and the screw thread root 212. The external thread 21 further includes the fourth side wall 213 located on one side of the screw thread crest 211 and the fifth side wall 214 located on the other side of the screw thread crest 211.

The locking notch 123 located on one side of the nut thread crest 121 is arranged on the internal thread 12. The locking notch 123 includes the first side wall 124 and the bottom wall 125. One end of the first side wall 124 is connected to the nut thread crest 121, and the other end of the first side wall 124 is connected to one end of the bottom wall 125. The bottom wall 125 is spirally distributed around the axis of the nut body 1. The bottom wall 125 is located between the nut thread crest 121 and the nut thread root 122. When the nut body 1 has not been tightened to the screw body 2, the external thread 21 is in clearance fit with the internal thread 12. When the nut body 1 has been tightened to the screw body 2, the external thread 21 enters the locking notch 123, and the screw thread crest 211 is in interference fit with the bottom wall 125 (FIG. 6) the interference fit area 300 is formed between the bottom wall 125 and the screw thread crest 211) to strengthen the locking force of the nut body so as to achieve the self-locking function, which has the advantage of being less likely to loosen.

In the present embodiment, the internal thread 12 is further provided with the second side wall 126 located on one side of the nut thread root 122. One end of the second side wall 126 is connected to the nut thread root 122, and the other end of the second side wall 126 is connected to the bottom wall 125 by the chamfer 127 or a rounded corner. When the nut body 1 has not been tightened to the screw body 2, the edge of the joint between the screw thread crest 211 and the fourth side wall 213 abuts on the chamfer 127 or rounded corner, so that the chamfer 127 or the rounded corner allows the screw crest 211 to enter the locking notch 123 more easily. When the nut body 1 has been tightened to the screw body 2, the external thread 21 enters the locking notch 123 and completely occupies the locking notch 123, the screw thread crest 211 is in interference fit with the bottom wall 125, and the fourth side wall 213 abuts on the first side wall 124. Further, the included angle between the first side wall 124 and the horizontal plane is 15°±5°. The included angle between the fourth side wall 213 and the horizontal plane is equal to the included angle between the first side wall 124 and the horizontal plane. The same included angle makes it easier for the fourth side wall 213 to abut on the first side wall 124, so that the external thread 21 can completely occupy and be engaged with the locking notch 123, which effectively increases the friction and improves the locking force.

In the present embodiment, the internal thread 12 is further provided with the third side wall 128 located on the other side of the nut thread root 122. When the nut body 1 is not tightened to the screw body 2, the fifth side wall 214 is in close contact with the third side wall 128. Further, the included angle between the third side wall 128 and the horizontal plane is 28°±5°. The included angle between the fifth side wall 214 and the horizontal plane is equal to the included angle between the third side wall 128 and the horizontal plane, which facilitates the engagement between the nut body 1 and the screw body 2, facilitates the close contact between the fifth side wall 214 and the third side wall 128, and can also produce a certain self-locking effect to prevent loosening.

The improved threads of the invention described above may also be applied to the external thread 21 of the screw body 2. Those embodiments are fully described and specified in the following paragraphs.

A lock screw includes the screw body 2. The screw body 2 includes the external thread 21. The external thread 21 includes the screw thread crest 211 and the screw thread root 212. A locking notch located on one side of the screw thread crest 211 is arranged on the external thread 21. The locking notch includes a first side wall and a bottom wall. One end of the first side wall is connected to the screw thread crest 211, and the other end of the first side wall is connected to one end of the bottom wall. The bottom wall is spirally distributed along the axial direction of the screw body 2, and the bottom wall is located between the screw thread crest 211 and the screw thread root 212. When the nut body 1 has not been tightened to the screw body 2, the external thread 21 is in clearance fit with the internal thread 12. When the nut body 1 has been tightened to the screw body 2, the internal thread 12 of the nut body 1 enters the locking notch, and the nut thread crest 121 of the nut body 1 is in interference fit with the bottom wall to make the locking force of the nut body stronger and achieve the self-locking function, which has the advantage of being less likely to loosen.

In the present embodiment, the external thread 21 is further provided with a second side wall located on one side of the screw thread root 212. One end of the second side wall is connected to the screw thread root 212. The other end of the second side wall is connected to the bottom wall by a chamfer or a rounded corner. The chamfer or the rounded corner allows the nut thread crest to enter the locking notch more easily.

The external thread 21 is further provided with a third side wall located on the other side of the screw thread root 212. When the nut body 1 has not been tightened to the screw body 2, the fifth side wall is in close contact with the third side wall, which facilitates the engagement between the nut body 1 and the screw body 2.

A threaded fastening assembly, therefore, includes the screw body 2 of the lock screw described above, and the nut body 1 screwed to the screw body 2. The nut body 1 includes the screw hole 11 and the internal thread 12 arranged on an inner side wall of the screw hole 11. The internal thread 12 includes the nut thread crest 121 and the nut thread root 122. The screw body 2 includes the external thread 21, and the external thread 21 includes the screw thread crest 211 and the screw thread root 212. The internal thread 12 further includes a fourth side wall located on one side of the nut thread crest 121 and a fifth side wall located on the other side of the nut thread crest 121. A locking notch located on one side of the screw thread crest 211 is arranged on the external thread 21. The locking notch includes a first side wall and a bottom wall. One end of the first side wall is connected to the screw thread crest 211, and the other end of the first side wall is connected to one end of the bottom wall. The bottom wall is spirally distributed around the axis of the screw body 2, and the bottom wall is located between the screw thread crest 211 and the screw thread root 212. When the nut body 1 has not been tightened to the screw body 2, the external thread 21 is in clearance fit with the internal thread 12. When the nut body 1 is tightened to the screw body 2, the internal thread 12 enters the locking notch, and the nut thread crest 121 is in interference fit with the bottom wall to make the locking force of the screw body 2 stronger, and achieve the self-locking function, which is less likely to loosen.

In the present embodiment, the external thread 21 is further provided with a second side wall located on one side of the screw thread root 212. One end of the second side wall is connected to the screw thread root 212, and the other end of the second side wall is connected to the bottom wall by a chamfer or a rounded corner. When the nut body 1 has not been tightened to the screw body 2, the edge of the joint between the nut thread crest 121 and the fourth side wall abuts on the chamfer or the rounded corner. The chamfer or the rounded corner allows the nut thread crest 121 to enter the locking notch more easily. When the nut body 1 has been tightened to the screw body 2, the internal thread 12 enters the locking notch and completely occupies the locking notch, the nut thread crest 121 is in interference fit with the bottom wall, and the fourth side wall abuts on the first side wall. Further, the included angle between the first side wall and the horizontal plane is 15°±5°. The included angle between the fourth side wall and the horizontal plane is equal to the included angle between the first side wall and the horizontal plane. The same included angle makes it easier for the fourth side wall to abut on the first side wall, so that the internal thread 12 can completely occupy and be engaged with the locking notch 123, which effectively increases the friction and improves the locking force.

In the present embodiment, the external thread 21 is further provided with the third side wall located on the other side of the screw thread root 212. When the nut body 1 has not been tightened to the screw body 2, the fifth side wall is in close contact with the third side wall. Further, the included angle between the third side wall and the horizontal plane is 28°±5°, and the included angle between the fifth side wall and the horizontal plane is equal to the included angle between the third side wall and the horizontal plane, which facilitates the engagement between the nut body 1 and the screw body 2, facilitates the close contact between the fifth side wall 214 and the third side wall 128, and can also produce a certain self-locking effect to avoid loosening.

What is claimed is:

1. A threaded fastening assembly, comprising:
    a nut body, and
    a screw body;
    wherein
    the screw body is screwed to the nut body; the nut body comprises a screw hole and an internal thread, and the internal thread is arranged on an inner side wall of the screw hole; the internal thread comprises a nut thread crest and a nut thread root; the screw body comprises an external thread; the external thread comprises a screw thread crest and a screw thread root; the external thread further comprises a fourth side wall located on a first side of the screw thread crest and a fifth side wall located on a second side of the screw thread crest; a locking notch located on a first side of the nut thread crest is arranged on the internal thread; the locking notch comprises a first side wall and a bottom wall; a first end of the first side wall is connected to the nut thread crest, and a second end of the first side wall is connected to one end of the bottom wall; the bottom wall is spirally distributed around an axis of the nut body; the bottom wall is located between the nut thread crest and the nut thread root; when the nut body is screwed to be tightened to the screw body, the external thread enters the locking notch, and the screw thread crest is in interference fit with the bottom wall;
    wherein the internal thread is further provided with a second side wall located on a first side of the nut thread root; a first end of the second side wall is connected to the nut thread root, and a second end of the second side wall is connected to the bottom wall by a chamfer or a rounded corner; when the nut body is not screwed to be tightened to the screw body, an edge of a joint between the screw thread crest and the fourth side wall abuts on the chamfer or the rounded corner; when the nut body is screwed to be tightened to the screw body, the external thread enters the locking notch and completely occupies the locking notch, the screw thread crest is in interference fit with the bottom wall, and the fourth side wall abuts on the first side wall.

2. The threaded fastening assembly according to claim 1, wherein, the internal thread is further provided with a third side wall located on a second side of the nut thread root; when the nut body is not screwed to be tightened to the screw body, the fifth side wall is in close contact with the third side wall.

3. The threaded fastening assembly according to claim 2, wherein, a third included angle between the third side wall and the horizontal plane is 28°±5°; a fourth included angle between the fifth side wall and the horizontal plane is equal to the third included angle between the third side wall and the horizontal plane.

4. The threaded fastening assembly according to claim 1, wherein, a first included angle between the first side wall and a horizontal plane is 15°±5°; a second included angle between the fourth side wall and the horizontal plane is equal to the first included angle between the first side wall and the horizontal plane.

5. A threaded fastening assembly, comprising:
    a nut body, and
    a screw body;
    wherein
    the screw body is screwed to the nut body; the nut body comprises a screw hole and an internal thread arranged on an inner side wall of the screw hole; the internal thread comprises a nut thread crest and a nut thread root; the screw body comprises an external thread; the external thread comprises a screw thread crest and a screw thread root; the internal thread further comprises a fourth side wall located on a first side of the nut thread crest and a fifth side wall located on a second side of the nut thread crest; a locking notch located on one side of the screw thread crest is arranged on the external thread; the locking notch comprises a first side wall and a bottom wall; a first end of the first side wall is connected to the screw thread crest, and a second end of the first side wall is connected to one end of the bottom wall; the bottom wall is spirally distributed around an axis of the screw body, and the bottom wall is located between the screw thread crest and the screw thread root; when the nut body is screwed to be tightened to the screw body, the internal thread enters the locking notch, and the nut thread crest is in interference fit with the bottom wall.

6. The threaded fastening assembly according to claim 5, wherein, the external thread is further provided with a second side wall located on a first side of the screw thread root; a first end of the second side wall is connected to the screw thread root; a second end of the second side wall is connected to the bottom wall by a chamfer or a rounded corner; when the nut body is not screwed to be tightened to the screw body, an edge of a joint between the nut thread crest and the fourth side wall abuts on the chamfer or the rounded corner; when the nut body is screwed to be tightened to the screw body, the internal thread enters the locking notch and completely occupies the locking notch, the nut thread crest is in interference fit with the bottom wall, and the fourth side wall abuts on the first side wall.

7. The threaded fastening assembly according to claim 6, wherein, the external thread is further provided with a third side wall located on a second side of the screw thread root; when the nut body is not screwed to be tightened to the screw body, the fifth side wall is in close contact with the third side wall.

8. The threaded fastening assembly according to claim 7, wherein, a first included angle between the first side wall and a horizontal plane is 15°±5'; a second included angle between the fourth side wall and the horizontal plane is equal to the first included angle between the first side wall and the horizontal plane.

9. The threaded fastening assembly according to claim 8, wherein, a third included angle between the third side wall and the horizontal plane is 28°±5°; a fourth included angle between the fifth side wall and the horizontal plane is equal to the third included angle between the third side wall and the horizontal plane.

\* \* \* \* \*